US006654221B2

(12) United States Patent
Noma et al.

(10) Patent No.: US 6,654,221 B2
(45) Date of Patent: Nov. 25, 2003

(54) HIGH VOLTAGE POWER SUPPLY DEVICE FOR LIGHTING DISCHARGE TUBE HAVING PROTECTION CIRCUIT AND FAULT PROTECTION CIRCUIT

(75) Inventors: Takashi Noma, Moriyama (JP); Yasuyuki Morishima, Kyotanabe (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/923,987

(22) Filed: Aug. 7, 2001

(65) Prior Publication Data

US 2002/0101696 A1 Aug. 1, 2002

(30) Foreign Application Priority Data

Aug. 15, 2000 (JP) ....................................... 2000-246234

(51) Int. Cl.[7] .................................................. H02H 9/04
(52) U.S. Cl. ...................................... 361/91.1; 361/91.1
(58) Field of Search .................... 361/91.1; 310/316.01, 310/317, 318, 314, 319

(56) References Cited

U.S. PATENT DOCUMENTS 5,859,489 A * 1/1999 Shimada ..................... 310/318
5,923,546 A * 7/1999 Shimada et al. .............. 363/40
6,028,388 A * 2/2000 Shimada ..................... 310/318
6,118,221 A * 9/2000 Kumasaka et al. ... 315/209 PZ
6,151,232 A * 11/2000 Furuhashi et al. ............ 363/97
6,348,755 B1 * 2/2002 Shimamura et al. ........ 310/318

FOREIGN PATENT DOCUMENTS

| | | |
|---|---|---|
| JP | 8107678 | 4/1996 |
| JP | 9107684 | 4/1997 |

* cited by examiner

*Primary Examiner*—Gregory J. Toatley, Jr.
*Assistant Examiner*—Danny Nguyen
(74) *Attorney, Agent, or Firm*—Keating & Bennett, LLP

(57) ABSTRACT

Current flowing through a cold cathode tube is detected and converted to a voltage with a resistor, and is fed to a tube current control circuit. The tube current control circuit drives a drive circuit to control a voltage applied to a piezoelectric transformer. Current from a constant-current source is used to charge a fault protection capacitor. A transistor is allowed to conduct while current flows through the cold cathode tube so that a voltage is developed in a resistor, and thereby, an electric charge is prevented from being stored in the fault protection capacitor, thereby stopping the operation of a fault protection circuit.

18 Claims, 7 Drawing Sheets

FIG. 9A FOR SMALL RECTIFICATION TIME-CONSTANT
PRIOR ART
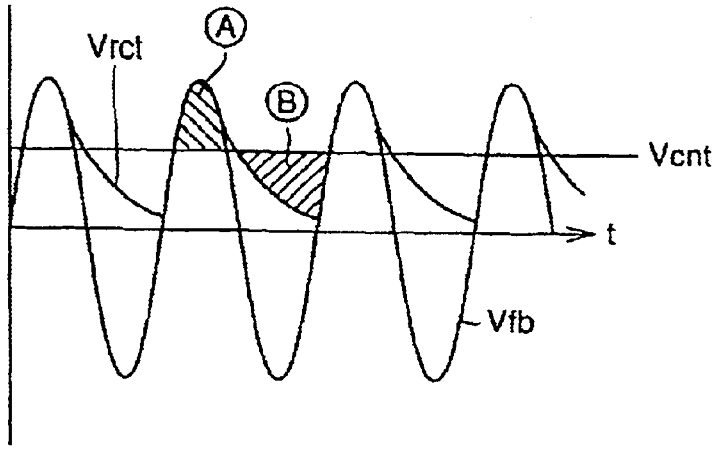
FIG. 9B FOR LARGE RECTIFICATION TIME-CONSTANT
PRIOR ART
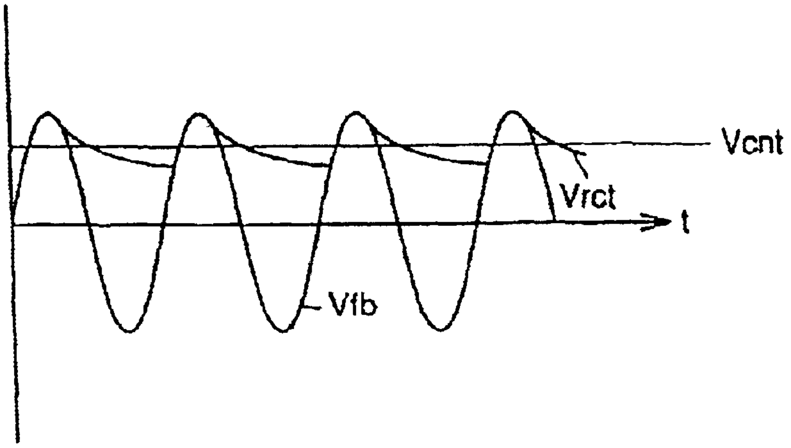

HIGH VOLTAGE POWER SUPPLY DEVICE FOR LIGHTING DISCHARGE TUBE HAVING PROTECTION CIRCUIT AND FAULT PROTECTION CIRCUIT

BACKGROUND OF THE INVENTION

1. Field of the Invention

The present invention relates to a high voltage power supply device for lighting a discharge tube, and more particularly, to a high voltage power supply devices for lighting discharge tubes having a fault protection circuit such as inverter power sources for liquid crystal panel back lights in portable information devices.

2. Description of the Related Art

FIG. 7 is a circuit diagram showing an example of a cold cathode tube lighting inverter using a conventional fault protection circuit. In FIG. 7, the cold cathode tube lighting inverter contains an inverter unit 10 and a fault protection circuit 20. To light a cold cathode tube 2, the inverter unit 10 comprises a step-up transformer 1, a tube current control circuit 3, a drive circuit 4, and a resistor 5 as a current-voltage converter, and a rectifier circuit 9. The drive circuit 4 produces an AC signal for driving the step-up transformer 1, corresponding to an input voltage, and feeds the signal to the step-up transformer 1. The step-up transformer 1 increases the voltage of the AC signal, and provides the signal to one of the electrodes of the cold cathode tube 2 to light the cold cathode tube 2.

The resistor 5 is connected between the other electrode of the cold cathode tube 2 and ground. A tube current flowing into the resistor 5 causes a voltage. The voltage is rectified in a rectifier circuit 9 comprising a diode 6, a resistor 7, and a capacitor 8. The rectification voltage Vrct is fed to the tube current control circuit 3. The tube current control circuit 3 controls the drive circuit 4 so that the rectification voltage Vrct becomes substantially equal to a desired constant value. In this way, the tube current is controlled to be substantially constant, due to the operation of the respective parts of the inverter unit 10. As a result, the brightness (brilliance) is also controlled to be substantially constant.

The fault protection circuit 20 comprises a resistor 21, a transistor 22, a capacitor 23, a constant-current source 24, and a thyristor 25. A remote signal is provided to the On-Off terminal of the tube current control circuit 3 via a resistor 26, and also, to the anode of the thyristor 25. The cathode of the thyristor is grounded. The rectification voltage Vrct output from the rectifier circuit 9 is given to the base of the transistor 22 via the resistor 21. The emitter of the transistor 22 is grounded. The gate terminal of the thyristor 25 and the constant-current source 24 are connected to the collector. The fault protection capacitor 23 is connected between the collector of the transistor 22 and ground.

Next, operation of the cold cathode tube lighting inverter shown in FIG. 7 will be described. When the cold cathode tube 2 lights normally, the tube current flows through the resistor 5, and the rectification voltage Vrct is thereby fed to the base of the transistor 22 via the resistor 21 of the fault protection circuit 20. Thus, the transistor 22 is able to conduct, and a charging current, caused by the constant-current source 24, bypasses the fault protection capacitor 23. Thus, no voltage is stored in the fault protection capacitor 23. As a result, the voltage at the gate terminal of the thyristor 25 is not increased, so that the thyristor 25 remains off, and the On-Off terminal of the inverter unit 10, maintained at the H level, continues to operate normally.

If the cold cathode tube 2 is not connected or malfunctions, no tube current flows in the resistor 5. Thus, the rectification voltage Vrct of the rectifier circuit 9 becomes zero, and the transistor 22 becomes unable to conduct. Thereby, a charging current from the constant-current source 24 flows into the fault protection capacitor 23. The gate voltage of the thyristor 25 is increased by a time constant value determined by the amount of the existing charging current and the electrostatic capacitance of the fault protection capacitor 23. When the gate voltage exceeds the constant value, the thyristor 25 is turned on, the on-off terminal of the inverter unit 10 reaches the L level, and the operation of the inverter unit 10 is stopped. That is, the circuit configuration is such that protection is provided if the cold cathode tube 2 is not connected or malfunctions.

FIG. 8 is a circuit diagram showing another example of a conventional cold cathode tube lighting inverter.

In FIG. 8, an inverter unit 30 includes a tube current control circuit 33 in addition to the step-up transformer 1 and the drive circuit 4 shown in FIG. 7. In this example, characteristically, the tube current control circuit 33 is AC-coupled by capacitor 34 to the cold cathode tube 2. The other electrode of the cold cathode tube 2 is grounded via a resistor 35. One terminal of a capacitor 34 is connected to the node of the cathode and resistor 35. The other terminal of the capacitor 34 is connected to the base of a transistor 38. The base of the transistor 38 is the input terminal of the tube current control circuit 33. A constant-current source 36 and a diode 51 are connected in series with each other. The voltage at the node is fed as a bias voltage Vf to the input terminal via a resistor 37.

This bias voltage Vf is cancelled out by the base-emitter voltage Vbe of the transistor 38. If at that time, the diode 51 and the transistor 38 are in the same chip, the temperature characteristic of the bias voltage Vf and that of the base-emitter voltage Vbe can be completely cancelled out. That is, it is assumed that the capacitor 34, the constant current source 36, the diode 51, the resistor 37, and the transistor 38 constitute an ideal diode which eliminates the bias voltage Vf. Then, the peak voltage of the voltage Vfb obtained by voltage-conversion of the tube current and the peak voltage of the rectification voltage Vrct, which is the emitter voltage of the transistor 38, are equal to each other.

A resistor 39 and a capacitor 40 are connected in parallel to each other between the emitter of the transistor 38 and ground. The rectification voltage Vrct is fed to the comparison input terminal of a comparator 41. A target voltage Vcnt is applied to the standard input terminal of the comparator 41. The rectification voltage Vrct is compared with the target voltage Vcnt by the comparator 41. The output is fed to an integration circuit 51 and integrated therein, and is input to an on-duty modulation circuit 42. The on-duty modulation circuit 42 controls the on-duty of the drive circuit 4 so that the average rectification voltage Vrct and the target voltage Vcnt become equal to each other. Thus, the tube current of the cold cathode tube 2, and moreover, the brilliance of the cold cathode tube 2 are controlled to have a constant value.

The conversion voltage Vfb, obtained by converting the tube current to a voltage by means of the resistor 35, is also input to the comparison input terminal of a comparator 43 in an fault protection circuit 50. A reference voltage Vudr is applied to the reference input terminal of the comparator 43. The output from the comparator 43 is fed to the base of a transistor 45 via a resistor 44. The emitter of the transistor 45 is grounded, and the collector is connected to the gate terminal of a thyristor 48. A constant-current source 47 is connected to the collector of the transistor 45, and a fault protection capacitor 46 is connected between the collector and ground. When the conversion voltage Vfb exceeds the reference voltage Vudr, the comparator 43 outputs an H level signal, causing the transistor 45 to be turned on, so that the charge stored in the fault protection capacitor 46 is discharged.

If the cold cathode tube 2 is broken, is not connected, or the like, resulting in no tube current, output from the comparator 43 is maintained at the L level. Thus, the voltage across both terminals of the fault protection capacitor 46 is increased by a time constant value which is determined by the constant current source 47 and the electrostatic capacitance of the fault protection capacitor 46. When the terminal voltage of the fault protection capacitor 46 reaches the on-voltage of the thyristor 48, the thyristor 48 is turned on, so that the operation of the inverter unit 30 is stopped.

In the above-described conventional example shown in FIG. 7, the tube current control circuit 3 is DC-connected to the other electrode of the cold cathode tube 2. Therefore, the accuracy of the tube current depends on the Vf of the diode 6. The Vf has a temperature characteristic. Thus, a problem arises in that when the ambient temperature changes, the tube current value of the cold cathode tube 2 changes.

The temperature characteristic of Vf is about 2.5 mV/° C. For example, in the case of an inverter of which the specified temperature range is zero ° C. to 60° C., the change in Vf is ±2.5 [mV/° C.]·60[° C.]=150 mV. To reduce the effects of this Vf change, a voltage generated in the detection resistor 5 is increased.

For example, to reduce the tube current variation caused by this temperature change to 1% or smaller, it is required that the voltage generated in the detection resistor 5 is about 150 mV÷1%=15$V_{o-p}$ (zero to peak)=10.6 Vrms or higher.

If a cold cathode tube for lighting a liquid crystal panel with a size of about 2 to 2.5 inches is selected as the cold cathode tube, the tube voltage will be about 200 Vrms. That is, the power loss caused by incorporation of the detection resistor 5 is large, that is, 10.6÷(200+10.6)=5%. Thus, a problem arises in that if the change in tube current which accompanies a change in ambient temperature is suppressed, the power loss increases due to the higher resistance value of resistor 5.

On the other hand, in the conventional example shown in FIG. 8, the tube current control circuit 33 is AC-coupled to the other electrode of the cold cathode tube 2. The voltage Vf of the diode 51 and the base-emitter voltage Vbe of the transistor 38 cancel out each other. Therefore, the dependency of the tube current on the ambient temperature is not caused in principle. Accordingly, it is not necessary to considerably increase the detection resistance 35. The power loss can be suppressed to be small compared to the example shown in FIG. 7.

However, in the case of formation of a one-chip IC using the AC-coupling configuration, Vcnt<Vf is selected, as the base terminal of the transistor 38 avoids the application of negative voltages.

FIGS. 9A and 9B illustrate wave-form charts at a conversion voltage Vfb, a target voltage Vcnt, and a rectification voltage Vrct for large and small rectification time constants which are determined by the resistor 39 and the capacitor 40 shown in FIG. 8.

Since the tube current is controlled so that the average of the target voltage Vcnt and that of the rectification voltage Vrct are equal to each other, the areas of the oblique line portions A and B shown in FIG. 9A are equal. Thus, as could be understood, when the rectification time constant is small, the peak voltage of the conversion voltage Vfb can be controlled to be relatively high, compared to the target voltage Vcnt. However, with the rectification time constant being gradually increased, the peak voltage of the conversion voltage Vfb converges to the target voltage Vcnt.

When the rectification time constant is decreased, the dispersion of the tube current tends to increase, as a result of dispersions in constants of the resistor 39 and the capacitor 40, that is, dispersions in time constant. For this reason, it is preferable that the rectification time constant is increased as much as possible from the viewpoint of the tube current accuracy. Thus, in many cases of practical design, the peak voltage of the conversion voltage Vfb is set to be substantially equal to Vcnt.

As seen in the above description, the peak voltage of the conversion voltage Vfb becomes less than the bias voltage Vf. Thus, even if the conversion voltage Vfb is provided directly to the transistor 45 as shown in the conventional example of FIG. 8, the transistor 45 is not turned on. Therefore, a problem arises in that an expensive comparator 43 needs to be incorporated.

Since a delay in lighting of the cold cathode tube 2 is caused in some cases, it is required that the voltage be continuously output for one to several seconds, although no tube current flows directly after the start. Therefore, in both of the conventional examples of FIGS. 7 and 8, each of the time constants, determined by the constant current source and the fault protection capacitor capacitance, is set at one to several seconds.

In the described circuits, a problem arises in that if there is a fault, such as generation of arc discharge, which is caused by partial disconnection of a high voltage wire, e.g., the fault protection circuit may fail to operate. In the case of arc discharge, the flow of the discharge tube current may start and stop at intervals shorter than a time of second order. Thus, with the conventional protection circuit, stopping-operation is impossible. In the worst case scenario, the circuit may be damaged, due to abnormal heating.

SUMMARY OF THE INVENTION

Accordingly, it is an object of the present invention to provide a high voltage power supply device for lighting a discharge tube in which the temperature dependency of the tube current accuracy can be solved, in which the power loss caused by the current detection resistance can be reduced, and which will stop the high voltage supply for faults such as partial high voltage wire disconnection.

To solve the above problems, according to the present invention, there is provided a high voltage power supply device for lighting a discharge tube which comprises a current-voltage converter that detects a current flowing through a discharge tube, and converts the current to a voltage for output, a tube current controller having an input portion thereof AC-coupled to the current-voltage converter and which controls the tube current flowing through the discharge tube so that the current becomes substantially constant, a protection circuit that stores an electric charge in a fault protection capacitor, recognizes the occurrence of a fault corresponding to the voltage across both terminals of the fault protection capacitor exceeding a predetermined value, and stops the control by the tube current controller, an impedance element connected between the discharge tube and the current-voltage converter, and a reset circuit that prevents the fault protection capacitor from being charged so that the protection circuit is not operated while current flows through the discharge tube corresponding to the voltage generated in the impedance element.

Accordingly, the temperature-dependence of the tube current accuracy is eliminated, AC coupling is employed. Thus, the power loss, caused by the current detection resistance, can be reduced.

According to another aspect of the present invention, there is provided a high voltage power supply device for lighting a discharge tube which comprises a current-voltage converter that detects a current flowing through a discharge tube, and converts the current to a voltage for output, tube current converter having an input portion thereof AC-coupled to the current-voltage converter and which controls the tube current flowing through the discharge tube so that the current becomes substantially constant, a protection circuit that stores an electric charge in a fault protection capacitor, recognizes the occurrence of a fault corresponding to the voltage across both terminals of the fault protection capacitor exceeding a predetermined value, and stopping the control by the tube current controller, and a time constant circuit for discharging the fault protection capacitor during a time determined by a first time constant after starting, the protection circuit having a circuit for charging the fault protection capacitor by a second time constant value which is shorter than the first time constant, wherein, immediately after starting, fault protection is carried out by the first time constant value, and after a predetermined time from the starting, the fault protection is carried out by the second time constant value.

Accordingly, the voltage can be continuously output during a period when lighting of the discharge tube lags immediately after the starting, so that protection can be provided against defects such as disconnection of high voltage wiring.

Preferably, the second time constant is set at 10 milliseconds or shorter.

As a result, effective protection can be also realized against partial disconnection of a high voltage wiring.

Also, preferably, the high voltage power supply device for lighting a discharge tube further comprises dimming means for changing the lighting duty ratio of the discharge tube for burst dimming corresponding to a dimming signal, by use of the tube current controller, and a hold circuit for maintaining a voltage across both terminals of the fault protection capacitor during a burst off period by use of the dimming means.

Accordingly, satisfactory burst dimming and protection-operation can be realized.

Also provided in accordance with the invention is a fault protection circuit for a high voltage power supply for lighting a discharge tube.

BRIEF DESCRIPTION OF THE DRAWING(S)

FIGS. 9A and 9B illustrate the respective waveforms of an AC connection input.

DETAILED DESCRIPTION OF EMBODIMENTS OF THE INVENTION

Figure 1:
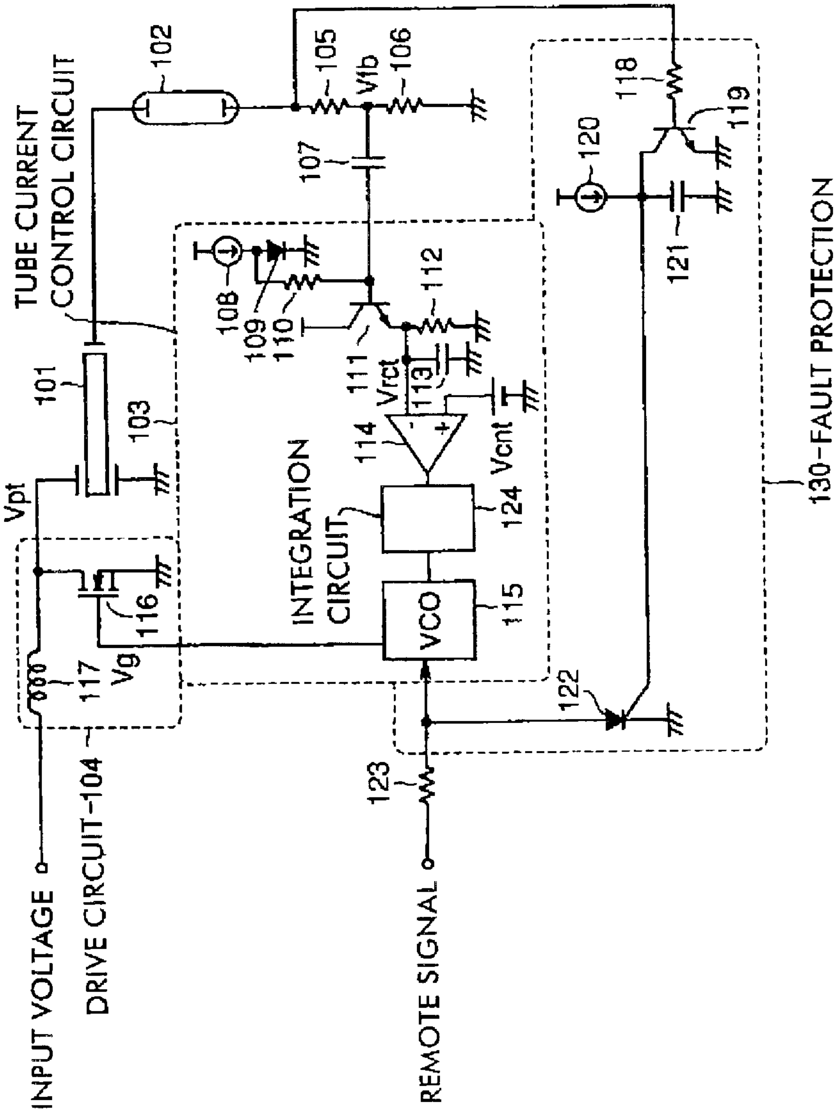
FIG. 1 is a circuit diagram of a high voltage power supply device for lighting a discharge tube according to an embodiment of the present invention.

FIG. 1 is a circuit diagram of a high voltage power supply device for lighting a discharge tube according to an embodiment of the present invention. In FIG. 1, according to this embodiment, a piezoelectric ceramic transformer 101 is used as the step-up transformer. The electrode on the primary of the piezoelectric ceramic transformer 101 is driven by a drive circuit 104. A high voltage is generated in the electrode on the secondary, due to the step-up action of the piezoelectric ceramic transformer 101. This high voltage is applied to one of the electrodes of the cold cathode tube 102. The other electrode of the cold cathode tube 102 is connected to ground via a resistor 105, which is an impedance element, and a resistor 106, which is a current-voltage converter. The conversion voltage Vfb at the node of the resistors 105 and 106 is rectified by an ideal diode comprising a capacitor 107, a constant current source 108, a diode 109, a resistor 110, and a transistor 111, and a rectification time constant circuit comprising a resistor 112 and a capacitor 113 to be a rectification voltage Vrct. The rectification voltage Vrct is fed to the comparison input terminal of a comparator 114. A target voltage Vcnt is applied to the reference input terminal thereof. The comparator 114 compares the rectification voltage Vrct with the target voltage Vcnt, and feeds the comparison result to a VCO (voltage control oscillator) 115 via an integration circuit 124. An output from the VCO 115 is input to the drive circuit 104 comprising an FET 116 and a coil 117.

A voltage generated in the resistor 105 is applied to the base of a transistor 119 via a resistor 118. The collector of the transistor 119 is connected to the gate terminal of a thyristor 122 and also to a constant current source 120. Furthermore, a fault protection capacitor 121 is connected between the collector of the transistor 119 and ground. A remote signal is input to the On-Off terminal of the VCO 115 via a resistor 123. The thyristor 122 is connected between the on-off terminal and the ground. A fault protection circuit 103 comprises the resistor 118, the transistor 119, the constant current source 120, the fault protection capacitor 121, and the thyristor 122.

Figure 2:
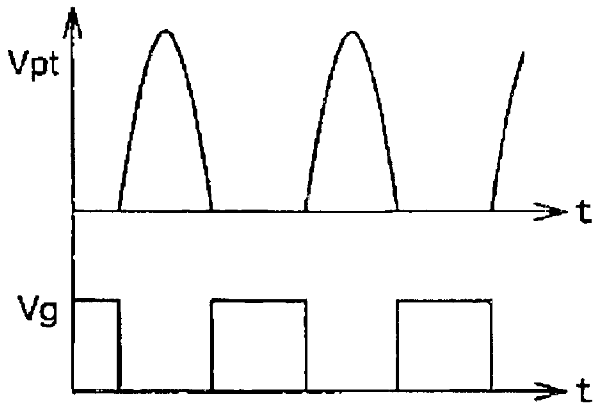
FIG. 2 is an operational waveform chart of the drive circuit shown in FIG. 1.

FIG. 2 shows voltage waveforms in the respective parts of the drive circuit shown in FIG. 1.

Hereinafter, operation of the high voltage power supply device for lighting a discharge tube will be described with reference to FIG. 2. An FET gate voltage Vg at a duty ratio of 50% is fed from the VCO 115 to the gate of the FET 116 as shown in FIG. 2. Current energy based on the input voltage is stored in the coil 117 during a period in which the gate voltage Vg is held on the H level. When the gate voltage Vg reaches the L level, the FET 116 is turned off, so that the energy stored in the coil 117 flows into the input capacitance of the piezoelectric ceramic transformer 101. If the inductance of the coil 117 is set corresponding to the input capacitance of the piezoelectric ceramic transformer 101, the input voltage Vpt to the piezoelectric ceramic transformer 101 can be formed so as to have a half-wave sinusoidal shape, as shown in FIG. 2. The switching loss can be reduced by zero-volt switching. The above-described configuration for driving is called "semi-E class drive". This is a system used most generally for drive of the piezoelectric ceramic transformer 101.

Figure 3:
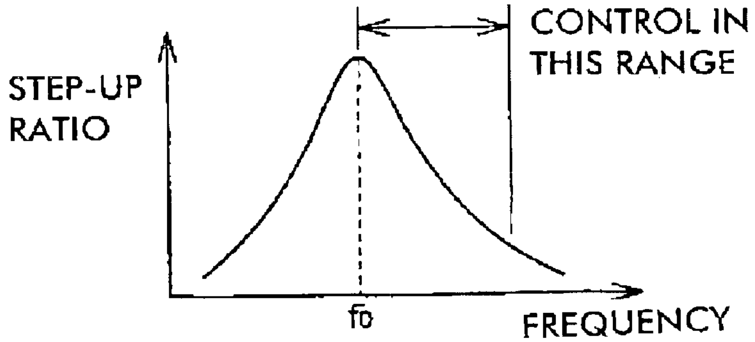
FIG. 3 is a graph showing the frequency—step-up ratio characteristic of the piezoelectric transformer shown in FIG. 1.

Moreover, FIG. 3 shows the frequency—step-up ratio characteristic of the piezoelectric ceramic transformer 101. Generally, a method using the characteristic on the higher frequency side of the resonance frequency 10 is employed.

In the embodiment of FIG. 1, in the control stable state, the rectification voltage Vrct is controlled so as to be equal to the target voltage Vcnt. The case in which the tube current is increased, due to some external disturbance (e.g., an increase in input voltage), will be discussed. With the tube current being increased, the conversion voltage Vfb and the rectification voltage Vrct are increased, so that the input voltage to the VCO 115 is reduced. Here, assuming that the VCO 115 is designed in such a manner that the frequency is increased when the input voltage is low, and is decreased when the input voltage is high, the drive frequency output to the drive circuit 104 is increased. Thus, the step-up ratio of the piezoelectric ceramic transformer 101 is reduced, so that the tube current is decreased, as shown in the frequency characteristic of FIG. 3. That is, the control is carried out in such a manner that an initial external disturbance is controlled. To the contrary, when the tube current is decreased, the input voltage to the VCO is increased and the drive frequency is reduced. Thus, the control is carried out in such a manner that reduction of the tube current is suppressed.

In the embodiment of FIG. 1, a tube current control circuit 103 including AC-coupling is employed. Thus, the peak voltage of the conversion voltage Vfb is approximately equal to Vf, which is approximately to 0.7 $V_{o-p}$. In this invention, characteristically, the resistor 105.

Figure 8:
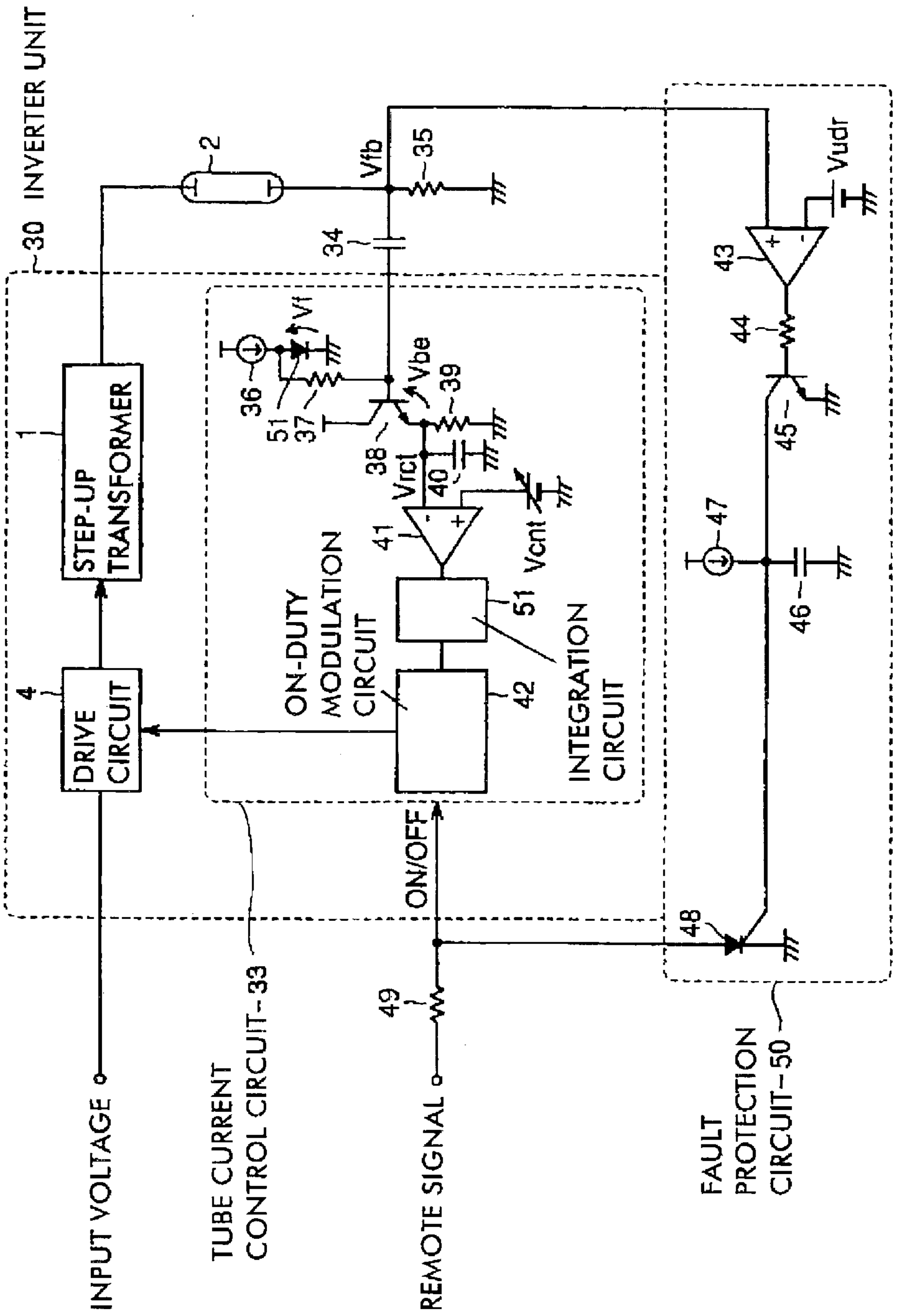
FIG. 8 PRIOR ART
FIG. 8 is a circuit diagram of another example of the conventional high voltage power supply device for lighting a discharge tube.

For example, when the resistances of the resistors 105 and 106 are equal to each other, a voltage of 2×Vfp≅1.4 $V_{o-p}$ is generated at the node between the resistor 105 and the cold cathode tube 102. Thus, the transistor 119 can be satisfactorily turned on-off by connection of the transistor 119 via the resistor 118. That is, advantageously, the protection circuit can be formed by use of one inexpensive transistor, instead of the expensive comparator 43 as used in the conventional example of FIG. 8.

Figure 7:
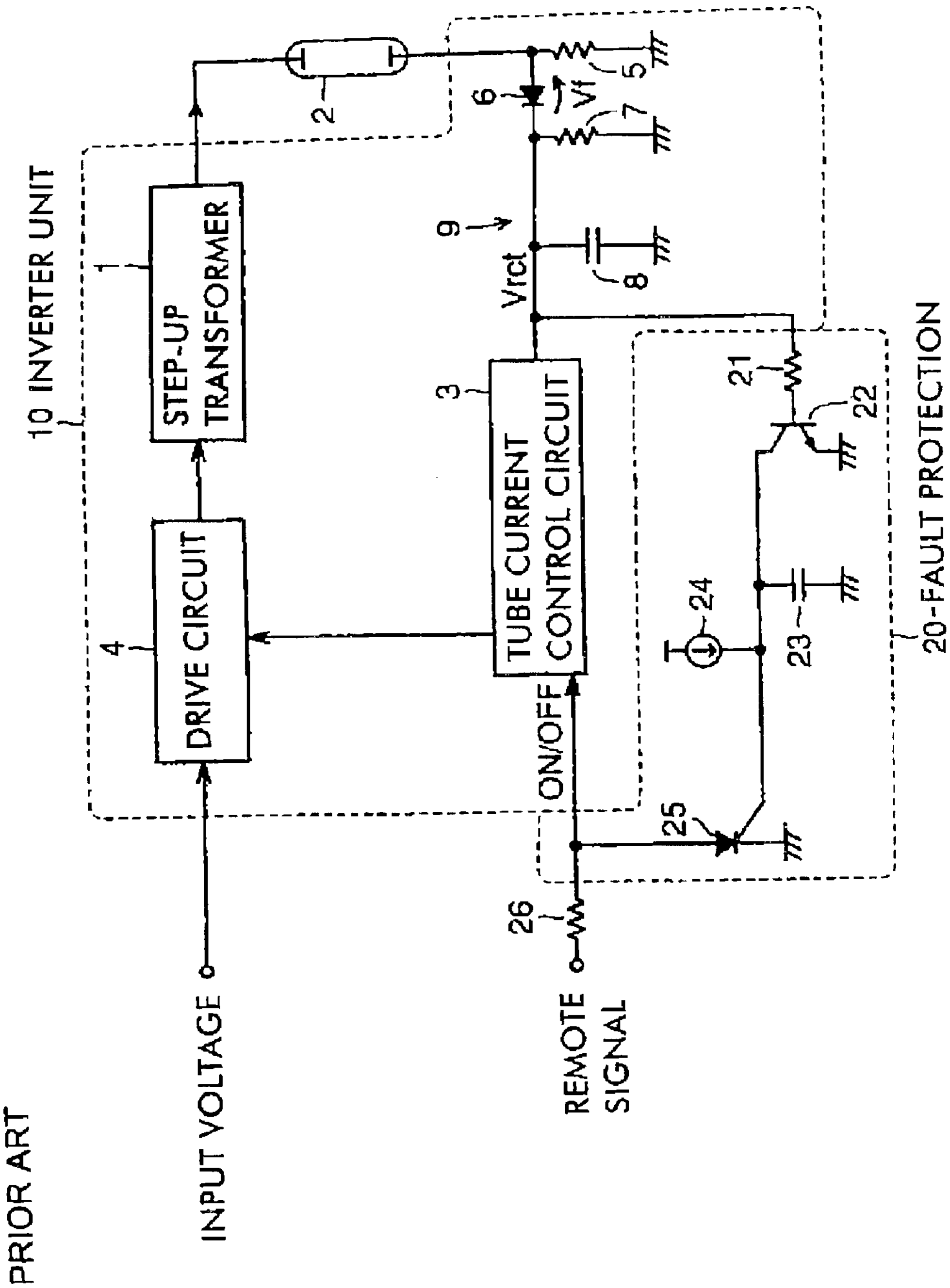
FIG. 7 PRIOR ART
FIG. 7 is a circuit diagram of a conventional high voltage power supply device for lighting a discharge tube.

The terminal voltage of the resistor 105 is 1.4 $V_{o-p}$. When the resistor 105 is applied to the cold cathode tube with a tube voltage of 200 Vrms, the power loss is 1.4 $V_{o-p}$÷(200 Vrms×1.414+1.4 $V_{o-p}$)=0.5%. Thus, the power loss can be significantly reduced compared to the conventional example of FIG. 7.

Figure 4:
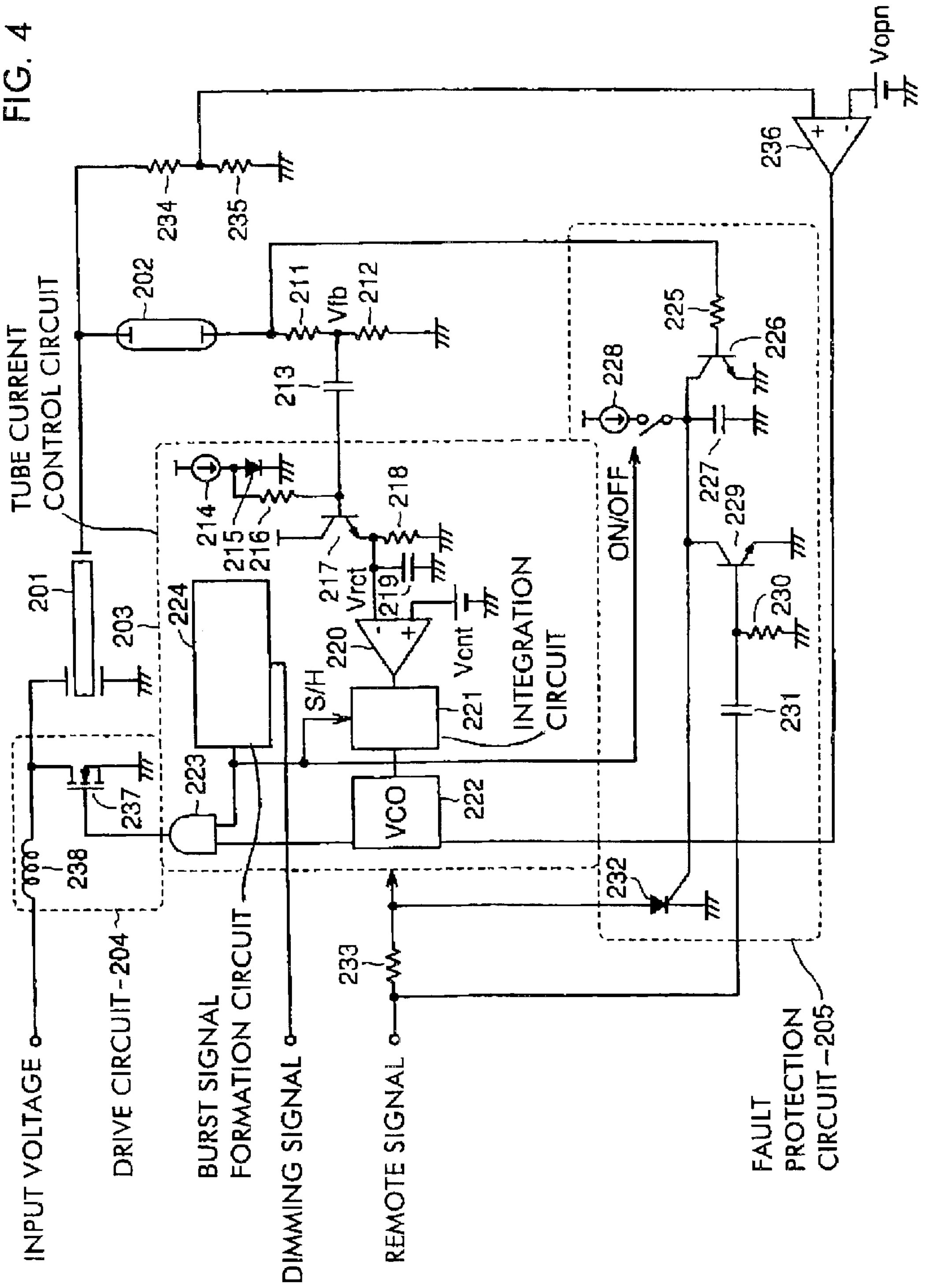
FIG. 4 is a circuit diagram of a high voltage power supply device for lighting a discharge tube according to another embodiment of the present invention.

FIG. 4 is a circuit diagram of a high voltage power supply device for lighting a discharge tube according to another embodiment of the present invention. In FIG. 4, the electrode on the primary of a piezoelectric transformer 201 is driven by a drive circuit 204, and a high voltage is generated at the electrode on the secondary, due to the step-up action of the piezoelectric transformer 201. This high voltage causes the cold cathode tube 202 to light. The tube current flows to ground side via a resistor 211 and a resistor 212, which is a current-voltage converter. A conversion voltage Vfb at the node between the resistors 211 and 212, similarly to the case of FIG. 1, is rectified by an ideal diode comprising a capacitor 213, a constant current source 214, a diode 215, a resistor 216, and a transistor 217, and a rectification time constant circuit comprising a resistor 218, and a capacitor 219 to be a rectification voltage Vrct. This rectification voltage Vrct is fed to the comparison input terminal of the comparator 220. A target voltage Vcnt is applied to the reference input terminal. The comparator 220 compares the rectification voltage Vrct with the target voltage Vcnt. The comparison result is fed to a VCO 222 via an integrator 221.

A burst signal formation circuit 224 generates a burst signal corresponding to a dimming signal externally applied. The burst signal output from the burst signal formation circuit 224 is fed to one of the input terminals of an AND gate 223. The AND gate 223 carries out the logical AND between the burst signal and an output from the VCO 222 and applies it to the drive circuit 204 comprising an FET 237 and a coil 238.

The voltage generated between the resistor 211 and ground is fed to the base of the transistor 226 via a resistor 225. The gate terminal of a thyristor 232 and the output terminal of a constant current circuit 228 are connected to the collector of the transistor 226. Moreover, a fault protection capacitor 227 is connected between the collector of the transistor 226 and the ground.

A remote signal is applied to the on-off terminal of a tube current control circuit 203 via a resistor 233. The thyristor 232 is connected between the on-off terminal and the ground. Furthermore, the remote signal is applied to the base of the transistor 229 via a capacitor 231. A resistor 230 is connected between the base of the resistor 229 and the ground. The emitter of the resistor 229 is grounded, and the collector is connected to the fault protection capacitor 227. The output voltage of the piezoelectric transformer 201 is divided by the resistors 234 and 235. The divided voltage is applied to the comparison input terminal of the comparator 236. A reference voltage Vopn is applied to the reference input terminal of the comparator 236. An output from the comparator 236 is applied to the VCO 222.

An output signal from the burst signal formation circuit 224 is fed to the integration circuit 221 as a sample/hold signal, and moreover, is fed to the constant current circuit 228, so that on-off of an output from the constant current circuit 228 is controlled.

The tube current constant control function of the high voltage power supply device for lighting a discharge tube shown in FIG. 4 under the normal operation is the same as that of FIG. 1. Thus, a detailed description is omitted.

Hereinafter, burst dimming will be described. In some cases, the burst dimming is called PWM dimming or duty dimming. According to the burst dimming, lighting—the switching on and off of the light of the discharge tube is carried out at such a high frequency (specially, about 150 to several hundreds Hz) as can not be discerned, and the brilliance of the discharge tube is controlled by changing the lighting duty ratio. That is, when the lighting duty ratio is reduced, the discharge tube appears uniformly dim.

The burst signal formation circuit 224 has a function of changing the lighting duty ratio, corresponding to a dimming signal externally applied. That is, when an output from the burst signal formation circuit 224 is at the L level, the AND gate 223 is off and no output from the VCO 222 is fed to the drive circuit 204. Thus, burst-off, that is, switching off of the light of the discharge tube, is carried out. On the other hand, when the output of the burst signal formation circuit 224 is at the H level, the output from the VCO 222 is fed to the drive circuit 204 via the AND gate 223. Thus, burst-on, that is, lighting of the discharge tube is carried out. Accordingly, the brilliance of the discharge tube can be controlled so as to have a desired value.

The tube current flowing through the electrode tube 202 becomes zero during the burst-off period. Thus, the tube current control circuit 203 sweeps the drive frequency to the lower frequency side. Simultaneously at the next burst-on, the step-up ratio of the piezoelectric transformer becomes too large, since the drive frequency is excessively low, and as a result, an excess tube current flows. Thus, a disadvantage arises in that desired burst dimming can not be carried out. For this reason, generally, a technique for carrying out desired burst dimming, in which an output from the integration circuit 221 is sample-held during the burst-off period, and in which the output voltage from the integration circuit 221 directly before the burst-off is changed to the burst-off is held during the burst-off period is employed.

If the cold cathode tube 202 is not connected, or the lighting is delayed, the load impedance of the piezoelectric transformer 201 becomes large, so that a significantly large output voltage is generated. Thus, dielectric breakdown or breaking of the piezoelectric transformer 201 may occur. Thus, an output voltage from the piezoelectric transformer 201 is divided by the resistors 234 and 235. The comparator 236, when it determines that the voltage exceeds the reference voltage Vopn, sweeps the frequency of the VCO 222 to be on the high frequency side. In this case, the control may be made so that the constant open voltage, determined by the Vopn, is output, or the VCO 222 may be reset to a maximum frequency, and the maximum frequency is swept to the lower frequency side again, whereby the output voltage of the piezoelectric transformer 201 is controlled so as to have a saw-tooth wave-form.

Operation of a protection circuit comprising the resistor 225, the constant current circuit 228, the fault protection capacitor 227, and the thyristor 232 of the fault protection circuit 205 is the same as that of FIG. 1. Here, the time constant determined by the constant current circuit 228 and the capacitor 227 is named a time constant 2.

On the other hand, a time constant determined by the capacitor 231 and the resistor 230 is provided. This is named time constant 1. Here, the time constants 1 and 2 are set at several seconds and several milliseconds, respectively.

In some cases, disconnection defects of a high voltage wiring are caused in the piezoelectric transformer 201 and a high voltage winding transformer. In the event that the high voltage wiring is completely disconnected, the tube current of the cold cathode tube 202 is continuously maintained at zero. Thus, even in the circuit shown in FIG. 1, the operation of the inverter circuit is stopped after a predetermined time. However, in case of partial disconnection of the high voltage wiring, the tube current flows and ceases to flow. Therefore, in the circuit shown in FIG. 1, the operation can not be stopped, which may lead to damages of the circuit before long.

Figure 5:
FIG. 5 illustrates an example of a tube current waveform at partial disconnection.
Figure 6:
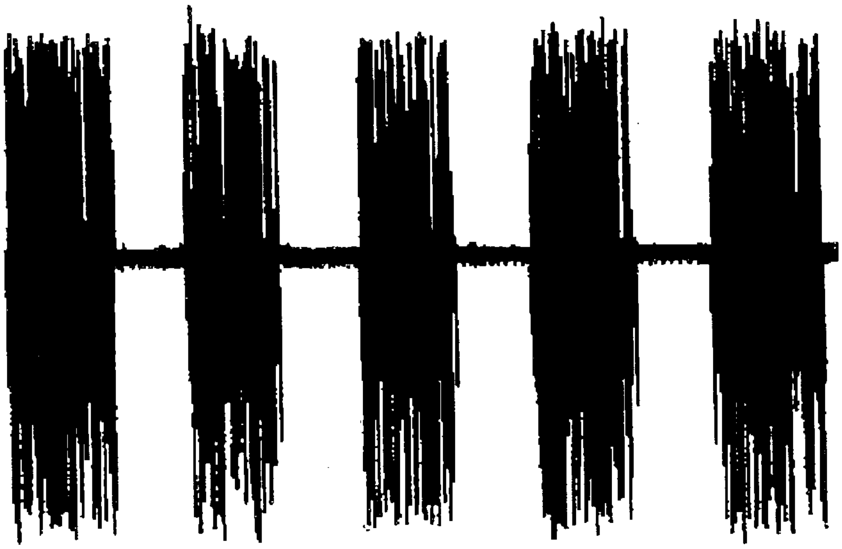
FIG. 6 is an enlarged illustration of the tube current waveform of FIG. 5.

FIG. 5 shows an example of a tube current waveform, obtained when the partial or incomplete disconnection is imitated. FIG. 6 is an enlarged view thereof.

As seen in FIGS. 5 and 6, in the case of the partial disconnection, the tube current flows while the discharge arc continues, and no current flows when the state is changed, e.g., by firing of the wire, caused by heat of the discharge arc. When the current ceases to flow, the voltage of the piezoelectric transformer 201 is increased, so that discharge arc is generated again and the tube current flows. This state is repeated, as seen in FIGS. 5 and 6.

The inventors of this application carried out the simulation test with different types of partial disconnection. As a result, the time periods when no tube current flows are dispersed, that is, in the range of 1 millisecond to 100 milliseconds. It has been empirically derived that almost all of the partial disconnections can be detected, and the operation can be stopped by deciding the case in which no current flows during a period of 10 milliseconds as a fault.

However, as described previously, a phenomenon in which, immediately after starting, lighting lags of the cold cathode tube has been observed. Accordingly, in case of addition of such a circuit that is stopped if no current flows during a period of 10 milliseconds or shorter, an inconvenience arises in that protection-operation is carried out, so that the circuit does not start, although the high voltage wiring is not disconnected. Therefore, in the circuit shown in FIG. 4, the transistor 229 is allowed to conduct in such a manner that no charge is stored in the fault protection capacitor 227 during the time constant 1 determined by the capacitor 231 and the resistor 230, that is, during a predetermined period (about several seconds) after the start, and if no tube current flows during the period determined by the time constant 2, after a lapse of the time constant 1, the operation can be stopped. Therefore, the operation can be stopped, avoiding inconveniences such as non-starts, which may occur even when the high voltage wiring is partially disconnected.

However, if the time constant 2 is decreased to be smaller than the burst-off period, the protection operation is carried out during the burst-off period. As a countermeasure, output of the constant current circuit 228 is stopped during the burst-off period. Thereby, the voltage of the fault protection capacitor 227 is not increased during the burst-off period. Thus, inconveniences such as protection being provided during burst dimming can be prevented.

The embodiments described in this application are illustrative in all respects, and are not restrictive. The scope of the present invention is specified by the patent claims, not by the above description, and is intended to include meanings equivalent to the patent scope and all modifications made within the scope.

As described above, according to the present invention, the impedance element is incorporated between the discharge tube and the current-voltage converter and an electric charge is prevented from being stored in the fault protection capacitor while current flows through the discharge tube corresponding to a voltage generated in the impedance element, whereby the protection circuit is prevented from operating. Thereby, an inexpensive protection circuit can be realized. Moreover, due to the use of an AC-coupled input, the temperature-dependence of the tube current accuracy can be eliminated, so that the power loss, caused by the current detection resistance, can be reduced.

Moreover, since two time constants for circuit-protection are provided, immediately after the start, circuit-protection can be provided by a large time constant value, and also, can be provided by a small time constant value, after a lapse of a predetermined time from the start. Thereby, the voltage can be continuously output during a period when lighting lags of the cold cathode tube immediately after the start, and moreover, protection against defects such as disconnection of a high voltage wiring or the like can be performed. Accordingly, this circuit can be effectively applied for liquid crystal back light inverters in portable information devices in which there is a higher possibility of disconnection of high voltage wiring caused by impacts added thereto while they are being used.

In particular, preferably, the second time constant, which is short, is set, e.g., at 10 milliseconds or smaller. Thereby, effective protection can be realized against partial disconnection of a high voltage wiring.

Also, preferably, during a burst off period, charging, made by use of a constant current, is stopped, and the voltage across both terminals of the fault protection capacitor is held. Thus, in the case in which the second time constant is set to be short, satisfactory burst dimming and protection-operation can be realized.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A high voltage power supply device for lighting a discharge tube comprising:

a current-voltage converter that detects a current flowing through a discharge tube, and converts the current to a voltage for output;

a tube current controller having an input portion thereof AC-coupled to the current-voltage converter and which controls the tube current flowing through the discharge tube so that the current becomes substantially constant;

a protection circuit that stores an electric charge in a fault protection capacitor by using a predetermined charge current, recognizes the occurrence of a fault corresponding to a voltage across both terminals of the fault protection capacitor exceeding a predetermined value, and stops the control by the tube current controller;

an impedance element connected between the discharge tube and the current-voltage converter; and a reset circuit that prevents the fault protection capacitor from being charged so that the protection circuit is not operated while current flows through the discharge tube, corresponding to the voltage generated in the impedance element.

2. A high voltage power supply device for lighting a discharge tube, comprising:

a current-voltage converter that detects a current flowing through a discharge tube, and converts the current to a voltage for output;

a tube current controller having an input portion thereof AC-coupled to the current-voltage converter and which controls the tube current flowing through the discharge tube so that the current becomes substantially constant;

a protection circuit that stores an electric charge in a fault protection capacitor by using a predetermined charge current, recognizes the occurrence of a fault corresponding to a voltage across both terminals of the fault protection capacitor exceeding a predetermined value, and stops the control by the tube current controller; and a time constant circuit for discharging the fault protection capacitor during a time determined by a first time constant after starting;

said protection circuit having a charging circuit that charges the fault protection capacitor by a second time constant value which is shorter than the first time constant;

wherein, immediately after starting, fault protection is carried out by the first time constant value, and after a predetermined time from the starting, fault protection is carried out by the second time constant value.

3. The high voltage power supply device for lighting a discharge tube of claim 2, wherein said second time constant value is set at 10 milliseconds or shorter.

4. The high voltage power supply device for lighting a discharge tube of claim 2, further comprising:

a dimming circuit for changing a lighting duty ratio of the discharge tube for burst dimming, in response to a dimming signal; and a hold circuit that maintains a voltage across both terminals of the fault protection capacitor during a burst off period when substantially no current flows in the discharge tube, thereby preventing the protection circuit from stopping the control by the tube current controller.

5. A high voltage power supply device for lighting a discharge tube comprising:

a current-voltage converter that detects a current flowing through a discharge tube, and converts the current to a voltage for output;

a tube current controller having an input portion thereof AC-coupled to the current-voltage converter and which controls the tube current flowing through the discharge tube so that the current becomes substantially constant;

a protection circuit that stores an electric charge in a fault protection capacitor by using a predetermined charge current, recognizes the occurrence of a fault corresponding to a voltage across both terminals of the fault protection capacitor exceeding a predetermined value, and stops the control by the tube current controller; and an impedance element connected between the discharge tube and the current-voltage converter and providing an output to the protection circuit for controlling charging of the fault protection capacitor.

6. The high voltage power supply device for lighting a discharge tube of claim 5, further comprising a reset circuit that prevents the fault protection capacitor from being charged so that the protection circuit is not operated while current flows through the discharge tube, corresponding to a voltage generated in the impedance element, said reset circuit comprising a switch having said voltage from the impedance element coupled as a control input, said switch bypassing current charging the fault protection capacitor when current flows through the discharge tube.

7. The high voltage power supply device for lighting a discharge tube of claim 5, further comprising a current source for providing current to charge the fault protection capacitor, and further comprising a switch controlled by a pulse width modulation dimmer signal to prevent charging of said fault protection capacitor during an off time of said dimming signal thereby to prevent said protection circuit from stopping the control by the tube current controller during the off time of said dimming signal.

8. The high voltage power supply device for lighting a discharge tube of claim 5, further comprising a high voltage protection circuit for controlling the tube controller to output a controlled voltage if the voltage provided to the discharge tube exceeds a predetermined value.

9. The high voltage power supply device for lighting a discharge tube of claim 5, further comprising a burst controller dimming circuit controlled by a dimming signal, the burst controller having an output, the output being coupled to one input of an AND gate, the AND gate having a second input from the tube controller, whereby a pulse width modulation of a drive signal is provided for driving the discharge tube.

10. A fault protection circuit for use in a high voltage power supply device for lighting a discharge tube comprising:

a current-voltage converter that detects a current flowing through a discharge tube, and converts the current to a voltage for output;

a tube current controller having an input portion thereof AC-coupled to the current-voltage converter and which controls the tube current flowing through the discharge tube so that the current becomes substantially constant;

a protection circuit that stores an electric charge in a fault protection capacitor by using a predetermined charge current, recognizes the occurrence of a fault corresponding to a voltage across both terminals of the fault protection capacitor exceeding a predetermined value, and stops the control by the tube current controller;

an impedance element connected between the discharge tube and the current-voltage converter; and a reset circuit that prevents the fault protection capacitor from being charged so that the protection circuit is not operated while current flows through the discharge tube, corresponding to the voltage generated in the impedance element.

11. A fault protection circuit for use in a high voltage power supply device for lighting a discharge tube, comprising:

a current-voltage converter that detects a current flowing through a discharge tube, and converts the current to a voltage for output;

a tube current controller having an input portion thereof AC-coupled to the current-voltage converter and which controls the tube current flowing through the discharge tube so that the current becomes substantially constant;

a protection circuit that stores an electric charge in a fault protection capacitor by using a predetermined charge current, recognizes the occurrence of a fault corresponding to a voltage across both terminals of the fault protection capacitor exceeding a predetermined value, and stops the control by the tube current controller; and a time constant circuit for discharging the fault protection capacitor during a time determined by a first time constant after starting;

said protection circuit having a charging circuit that charges the fault protection capacitor by a second time constant value which is shorter than the first time constant;

wherein, immediately after starting, fault protection is carried out by the first time constant value, and after a predetermined time from the starting, fault protection is carried out by the second time constant value.

12. The fault protection circuit of claim 11, wherein said second time constant value is set at 10 milliseconds or shorter.

13. The fault protection circuit of claim 11, further comprising:

a dimming circuit for changing a lighting duty ratio of the discharge tube for burst dimming, in response to a dimming signal; and a hold circuit that maintains a voltage across both terminals of the fault protection capacitor during a burst off period when substantially no current flows in the discharge tube, thereby preventing the protection circuit from stopping the control by the tube current controller.

14. A fault protection circuit for use in a high voltage power supply device for lighting a discharge tube comprising:

a current-voltage converter that detects a current flowing through a discharge tube, and converts the current to a voltage for output;

a tube current controller having an input portion thereof AC-coupled to the current-voltage converter and which controls the tube current flowing through the discharge tube so that the current becomes substantially constant;

a protection circuit that stores an electric charge in a fault protection capacitor by using a predetermined charge current, recognizes the occurrence of a fault corresponding to a voltage across both terminals of the fault protection capacitor exceeding a predetermined value, and stops the control by the tube current controller; and an impedance element connected between the discharge tube and the current-voltage converter and providing an output to the protection circuit for controlling charging of the fault protection capacitor.

15. The fault protection circuit of claim 14, further comprising a reset circuit that prevents the fault protection capacitor from being charged so that the protection circuit is not operated while current flows through the discharge tube, corresponding to a voltage generated in the impedance element, said reset circuit comprising a switch having said voltage from the impedance element coupled as a control input, said switch bypassing current charging the fault protection capacitor when current flows through the discharge tube.

16. The fault protection circuit of claim 14, further comprising a current source for providing current to charge the fault protection capacitor, and further comprising a switch controlled by a pulse width modulation dimmer signal to prevent charging of said fault protection capacitor during an off time of said dimming signal thereby to prevent said protection circuit from stopping the control by the tube current controller during the off time of said dimming signal.

17. The fault protection circuit of claim 14, further comprising a high voltage protection circuit for controlling the tube controller to output a controlled voltage if the voltage provided to the discharge tube exceeds a predetermined value.

18. The fault protection circuit of claim 14, further comprising a burst controller dimming circuit controlled by a dimming signal, the burst controller having an output, the output being coupled to one input of an AND gate, the AND gate having a second input from the tube controller, whereby a pulse width modulation of a drive signal is provided for driving the discharge tube.

* * * * *